US009111693B2

(12) United States Patent
Madiberk et al.

(10) Patent No.: US 9,111,693 B2
(45) Date of Patent: Aug. 18, 2015

(54) SUPER CAPACITOR OF HIGH SPECIFIC CAPACITY AND ENERGY DENSITY AND THE STRUCTURE OF SAID SUPER CAPACITOR

(75) Inventors: Vello Madiberk, Tartu (EE); Jaan Leis, Tartu (EE); Mati Arulepp, Tartu (EE); Kusta Rumma, Tartu (EE); Anti Perkson, Nõo (EE)

(73) Assignee: OU SKELETON TECHNOLOGIES GROUP, Tallinn (EE)

( * ) Notice: Subject to any disclaimer, the term of this patent is extended or adjusted under 35 U.S.C. 154(b) by 226 days.

(21) Appl. No.: 13/820,984

(22) PCT Filed: Sep. 5, 2011

(86) PCT No.: PCT/IB2011/002288
§ 371 (c)(1),
(2), (4) Date: Jun. 26, 2013

(87) PCT Pub. No.: WO2012/032407
PCT Pub. Date: Mar. 15, 2012

(65) Prior Publication Data
US 2013/0286542 A1   Oct. 31, 2013

(30) Foreign Application Priority Data
Sep. 6, 2010   (EE) .................................. 201000068

(51) Int. Cl.
*H01G 9/00* (2006.01)
*H01G 11/32* (2013.01)
(Continued)

(52) U.S. Cl.
CPC .............. *H01G 11/32* (2013.01); *H01G 11/58* (2013.01); *H01G 11/66* (2013.01); *H01G 11/70* (2013.01);
(Continued)

(58) Field of Classification Search
USPC ......... 361/502, 503–504, 508–512, 516–519, 361/523–525, 528–530
See application file for complete search history.

(56) References Cited

U.S. PATENT DOCUMENTS

| 5,888,673 A | 3/1999 | Kawasato et al. |
| 5,896,647 A | 4/1999 | Shkuratoff |

(Continued)

FOREIGN PATENT DOCUMENTS

| DE | 4127743 A1 | 3/1993 |
| EP | 1426987 A2 | 6/2004 |

(Continued)

OTHER PUBLICATIONS

International Preliminary Report on Patentability issued in International Application No. PCT/1B2011/002288 on Mar. 12, 2013.

(Continued)

*Primary Examiner* — Nguyen T Ha
(74) *Attorney, Agent, or Firm* — Birch, Stewart, Kolasch & Birch, LLP

(57) ABSTRACT

This invention provides a method of manufacture of the electrochemical system of the electric double layer prismatic capacitor from electrically connected in parallel of semi-wound packages of micro/mesoporous carbon composite electrode pairs separated by porous cage. According to the method the pre-made carbon film will be covered with a layer of aluminum foil layer using a vacuum deposition method thus forming a current collector of an electrochemical system. Subsequently the pairs of electrodes are formed from a carbon composite electrode which are wounded or flipped to flat packages so that the ends of current collectors protruding from folded packages are joined together in parallel and thereafter the ends of current collectors are connected correspondingly to the positive and negative current terminal of the electric double layer capacitor.

20 Claims, 7 Drawing Sheets

(51) Int. Cl.
*H01G 11/58* (2013.01)
*H01G 11/66* (2013.01)
*H01G 11/70* (2013.01)
*H01G 11/74* (2013.01)
*H01G 11/78* (2013.01)
*H01G 11/80* (2013.01)
*H01G 11/82* (2013.01)
*H01G 11/84* (2013.01)

(52) U.S. Cl.
CPC ............ *H01G 11/74* (2013.01); *H01G 11/78* (2013.01); *H01G 11/80* (2013.01); *H01G 11/82* (2013.01); *H01G 11/84* (2013.01); *Y02E 60/13* (2013.01); *Y10T 29/417* (2015.01)

(56) References Cited

U.S. PATENT DOCUMENTS

| | | | |
|---|---|---|---|
| 6,201,686 B1 | 3/2001 | Hiratsuka et al. | |
| 6,246,568 B1 * | 6/2001 | Nakao et al. | 361/502 |
| 6,430,031 B1 * | 8/2002 | Dispennette et al. | 361/502 |
| 6,602,742 B2 * | 8/2003 | Maletin et al. | 438/142 |
| 6,762,926 B1 | 7/2004 | Shiue et al. | |
| 6,783,896 B2 | 8/2004 | Tsujioka et al. | |
| 6,787,267 B2 | 9/2004 | Tsujioka et al. | |
| 7,116,545 B2 * | 10/2006 | Farahmandi et al. | 361/502 |
| 7,295,423 B1 * | 11/2007 | Mitchell et al. | 361/502 |
| 8,456,802 B2 * | 6/2013 | Kobayashi | 361/502 |
| 8,760,851 B2 * | 6/2014 | Signorelli et al. | 361/502 |
| 2004/0191612 A1 | 9/2004 | Akita et al. | |
| 2005/0057888 A1 | 3/2005 | Mitchell et al. | |
| 2006/0148112 A1 | 7/2006 | Mitchell et al. | |
| 2009/0180238 A1 | 7/2009 | Gallay et al. | |
| 2012/0099244 A1 * | 4/2012 | Lee et al. | 361/502 |
| 2012/0134072 A1 * | 5/2012 | Bae et al. | 361/502 |

FOREIGN PATENT DOCUMENTS

| | | |
|---|---|---|
| GB | 2056501 A | 3/1981 |
| JP | 2008-258220 A | 10/2008 |
| WO | 02/39468 A2 | 5/2002 |
| WO | 2004/094307 A1 | 11/2004 |
| WO | 2005/118471 A1 | 12/2005 |
| WO | 2010/006179 A2 | 1/2010 |
| WO | 2010/011509 A2 | 1/2010 |

OTHER PUBLICATIONS

International Search Report issued in International Application No. PCT/IB2011/002288 on May 8, 2012.

* cited by examiner

SUPER CAPACITOR OF HIGH SPECIFIC CAPACITY AND ENERGY DENSITY AND THE STRUCTURE OF SAID SUPER CAPACITOR

TECHNICAL FIELD

Present invention is related to prismatic electric double-layer capacitor with carbon composite electrodes of high energy density. Present invention is also related to producing capacitor batteries of high energy density.

BACKGROUND ART

Super capacitor, or ultracapacitor, or supercondenser is an energy storage device of high efficiency, which can be either electric double-layer capacitor, redox capacitor or hybrid capacitor. Present invention is related to electric double-layer capacitor in which energy is stored in the surface of carbon electrodes with electrostatically large surface area, in the so-called electric double layer. Capacitor of that kind is characterised by a very rapid charge-discharge cycle, from few minutes to few seconds. For simplicity's sake the electric double-layer capacitor shall be henceforth called super capacitor. In order to achieve the good energy and power output parameters of the super capacitor the composition of its components needs to be well optimized. A significant factor is the compliance of electrode materials with each other, i.e. microporous carbon of large surface area and the electrolyte. There is a general rule, according to which the smaller the pores, or gaps are in the carbon of the electrode, the higher is the apparent density of corresponding carbon and the higher can be the maximum double-layer capacity of given super capacitor. The more accurately the electrolyte ions fit into the so-called pores, the bigger specific capacity and energy density is achieved with given carbon electrodes. On the other hand, it is known that if the ratio of the size of ions and pores approaches one, the diffusional resistance increases significantly and, from certain moment onwards, adsorption energy exceeds the energy required for ion desorptsion within the voltage range employed at discharging. So-called screening out of ions from the electrolyte solution shall take place. As a result of that, internal resistance of the electrochemical system increases and power output properties of the capacitor deteriorate. Methods of preparing micro/mesoporous carbon materials with optimised pore size distribution are described for example in [WO 2004/094307] and [WO 2005/118471].

The optimisation of porosity and pore sizes of microporous carbon according to the dimensions of the electrolyte ions is known from prior art [WO 02/39468]. Carbidic carbon of varying nanostructure and pore distribution allows balancing the positive and negative electrode in electrode pairs and will also provide novel opportunities for optimising the electrolytes' composition and the co-existence of the electrolyte and electrode pairs according to the desired energy and power output properties of the super capacitor.

On the other hand, the smaller the carbon material's pores are, the smaller must be the electrolyte's ions. Ion dimensions can be significantly reduced by polar environment, i.e. a solvent or mixture of solvents with high dielectric permittivity. The "dilution" of high-polarity solvents with fluids of low viscosity in order to achieve through reducing viscosity a better mobility of electrolyte ions in a polar condensed environment is known from prior art (e.g. [U.S. Pat. No. 5,888,673], [U.S. Pat. No. 6,783,896], [U.S. Pat. No. 6,787,267]).

In order to achieve the maximum energy density and specific capacity of a super capacitor it is important to balance the positive and negative electrode capacities in the electrode pair. Balancing of electrodes by masses is described for example in US2006/0148112, MAXWELL TECHNOLOGIES INC., Jun. 7, 2006. The super capacitor described in current invention achieves superior energy and power output properties by balancing the thicknesses of carbidic carbon composite electrodes of varying specific capacity. The pores on a negative electrode are bigger and the electrode has inasmuch smaller density as the positive electrode, which is necessary for achieving the good mobility of ions and low internal resistance of the electrochemical system. While the specific capacity of the negative electrode is somewhat smaller than that of the positive electrode, it leads to employing negative electrodes, which are up to 10% thicker than positive electrodes in order to equalise the electrode capacities.

An important requirement for achieving the low internal resistance of the super capacitor is the low charge transport resistance between the carbon electrode and current collector. Abrading of current collectors and improving the bonding by a carbon layer are known in prior art as the mechanical treatments of the aluminium foil layer, used as the mechanical current collector, described for example by PCT/US2009/050324 and PCT/US2009/050122. For improving the electric conductivity between the carbon layer and the current collector an electrically conductive and adhesion-improving intermediate layer is used, which is normally a polymer (e.g. polyvinylidene fluoride) including carbon nano particles (e.g. lampblack, nanographite, etc.). For reducing the resistance of charge transport between carbon and current collector in carbon fabric electrodes, deposition of aluminium on the carbon fabric is used, as described by US2005/0057888. Current invention describes covering one surface of a powdery pressed carbon composite electrode with a layer of aluminium by a special covering method, comprising a plasma-activated physical vacuum deposition method, which increases the mechanical strength of carbon composite electrodes, while also providing the maximum electrical contact surface between the topmost particles of the carbon layer and surface of the current collector. Aluminium particles deposited on the carbon film penetrate at pressure contact the ultra-thin non-conducting oxide layer on the aluminium foil, which acts as a current collector, so the prior abrasion or other mechanical/chemical treatment of the foil surface is not required.

Solid electrochemical package, wound from continuous electrode, as it normally exists in cylindrical super capacitors, entails a risk that the negatively and positively charged electrodes facing each other in the pair of electrodes have shifted in relation to each other during packing. This can cause at electric cyclisation of the electrochemical element the constant "overloading" of the electrode not aligned with the counterpart of the opposite charge, which can result in greater self-discharge, electrolyte disintegration and partial deactivation or disintegration of the electrode and rapid deterioration of super capacitor properties. As a solution to this problem, prior art (US2009/0180238) provides balancing of shifted electrodes or electrodes that do not coincide due to technological defects by removing a layer of non-coinciding activated carbon by mechanical treatment. Prismatic super capacitor, being the object of present invention, comprises a package of several flipped electrode pairs, connected electrically in parallel, in which the shifting of electrode pairs at flapping occurs with lower probability and, if it does, the few substandard packages can be replaced by ones of good quality, without having to dispose of the entire electrochemical system of the super capacitor. Also, it is important to consider in assembling the electrode pairs and flipping into packages that the carbon electrode layer that has no counterpart would not become the outer layers of packages, as it would increase the super capacitor self-discharge. Thus, when compared with cylindrical capacitors, the cylindrical capacitor according to the invention holds fewer chances of defects and occasional substandard electrode pairs occurring in the super capacitor, while the product quality, reliability and lifetime are improved.

DISCLOSURE OF INVENTION

Current invention describes carbon/carbon Electrical Double-Layer Capacitor (EDLC) of high specific capacity and energy density, which includes a negatively charged micro/mesoporous carbon composite electrode and a positively charged micro/mesoporous carbon composite electrode, separated from each other by a separator having porosity all through.

The invention describes also the structure of prismatic-shape carbon/carbon EDLC of high specific capacity and energy density, which partially guarantees the efficient packing density and low internal resistance of the electrochemical system. The peculiarity of the structure lies in the fact that the super capacitor consists of wound packages of electrode pairs, connected electrically in parallel, ensuring the high transmission capacity of charges of the electrochemical system and thus lower internal resistance.

The invention also describes method for manufacturing EDLC carbon composite electrodes, being an important component in achieving the low internal resistance of the electrochemical system and ensuring efficient charge transport between the carbon electrode and the current collector. The peculiarity of the method lies in generating the electrical contact in carbon films prepared by roller dies. Electrical contact is achieved by covering carbon film by an ultra-thin layer of metal—normally a layer of aluminium, employing a method, which guarantees penetration of aluminium particles in the surface layer particles of the carbon fibre and between them. This way, maximum contact surface is achieved between metal and carbon, the size of which depends also on the surface coarseness of the carbon film—therefore depending on the size and shape of carbon particles.

BRIEF DESCRIPTION OF DRAWINGS

Method according to the invention and carbon composite electrode structure and its details employing the method are described in the following with reference to figures in which.

BEST MODE FOR CARRYING OUT THE INVENTION

Figure 1:
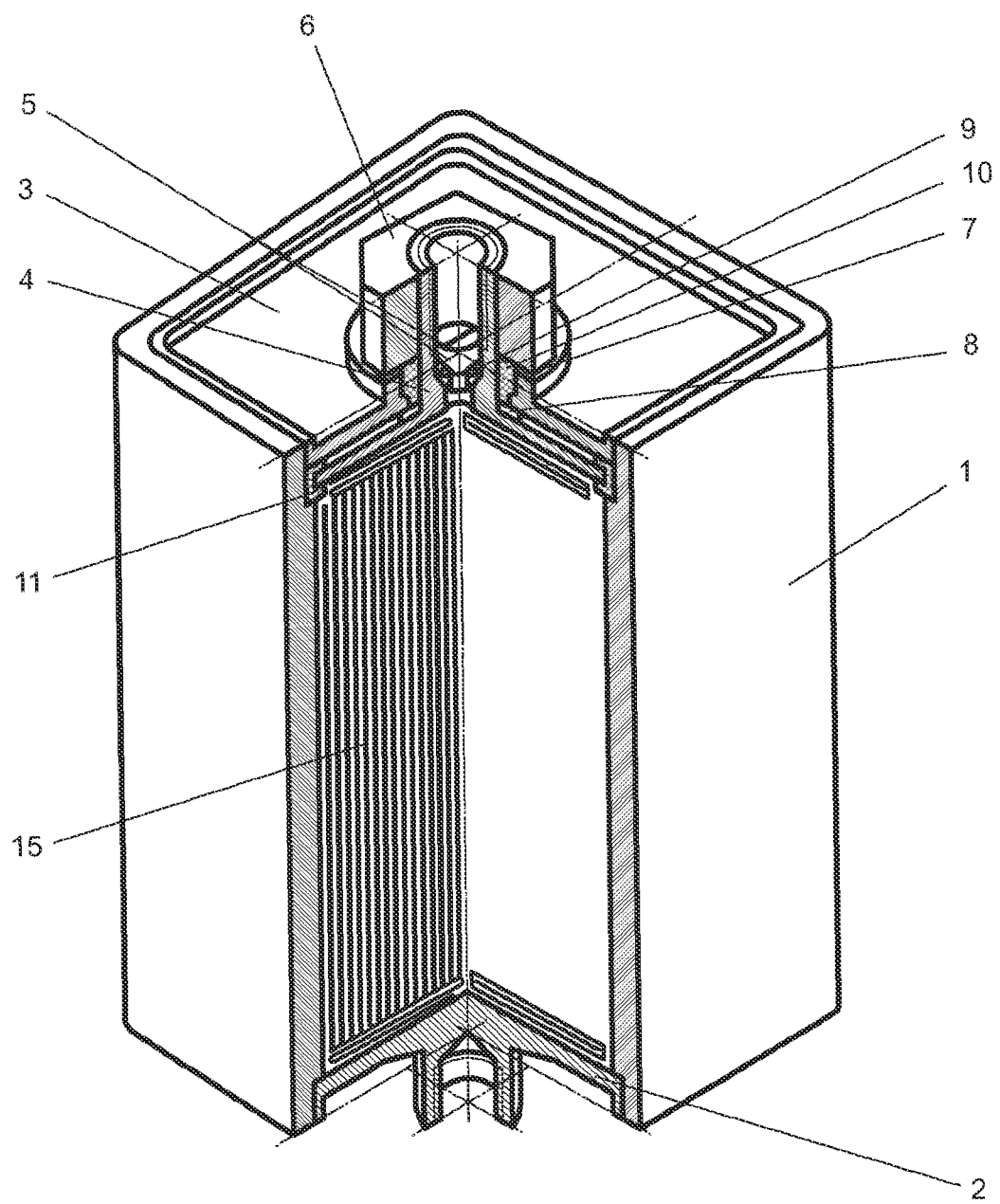
FIG. 1 shows super capacitor with prismatic housing according to the invention.

The following exemplary embodiment describes the structure and technical solutions of the electrochemical system and housing of the prismatic super capacitor (see FIG. 1) according to the invention with novel energy and power output properties. Super capacitor according to the invention (FIG. 1) comprises: prismatic external portion of the housing 1; bottom cap 2; end cap 3; current terminal 4; plug of the charging hole 5; current terminal nut 6; insulation washer of the nut 7; insulation piece of the current terminal 8; rubber sealing of the charging hole 9; rubber sealing of the current terminal 10; insulator of the inner edge of the current terminal 11, plates insulating the capacitor ends on the side of the current terminals (not shown on figures), and the shrinkable cover insulating the prismatic part of the capacitor (not shown on FIG. 1) and the electrochemical system 15.

Carbon composite electrode according to the invention was formed as follows: 92 mass fractions of porous carbon were impregnated with ethanol until paste-like condition, cooled to ~4° C. Then, 8 mass fractions of polymeric binders were added (PTFE, Aldrich, 60% dispersion in water). After careful dispersion the received mixture was treated for creating binding agent fibres and then dried at 90° C. for ~1 hour at atmospheric pressure. Then, petroleum ether was added for increasing plasticity, mixture was pressed into a 2-3 mm thick sheet and formed by roller dies gradually into a ~100 µm thick carbon film. Carbon film was dried in vacuum at 150° C., cut to the dimensions of the electrode and connected to the current collector.

Possible current collector materials are for example soft foodstuffs packaging foil Al-foil with unabraded surface (10-20 µm), rigid Al-foil (e.g. Skultuna, 14 µm); chemically abraded so-called cathodic foils, e.g. C209, KDK Cor. (Japan, 20 µm); KAPPA 204 (Becromal, 20 µm); KAPPA 304 (Becromal, 30 µm); etc.

Options for binding activated carbon on the current collector are the following: one-sided; two-sided; pressure contact; glued; paste compaction to current collector. Pressure contact between the carbon composite electrode and the current collector is preferred in the super capacitor described in current invention. Also, the invention provides for reducing the resistance of charge transport between the current collector and carbon by creating aluminium contacts with activated carbon films by covering with a thin layer of metal. For that one can use e.g. vacuum evaporation method or vacuum deposition method or metal gun-spray method. Current invention relates in detail to plasma-activated physical vacuum deposition method, which only at certain modes and conditions defined in the invention guarantees on porous carbon film a coating with mechanical durability and good electric conductivity.

Preparing aluminium contacts according to the invention for positive and negative electrode is performed by arc-light ion plasma method in the argon environment. It is preceded by vacuuming of electrodes at temperature, which is required to be lower than that of the softening temperature of the polymeric binding agent belonging to the electrode composition. Optimal temperature for carbon composite electrodes roll-pressed from carbidic carbon is 140-150° C. Pre-vacuuming of performed objects immediately before coating within ca 48 hours is essential in order to achieve stable results in manufacturing aluminium contacts.

In the exemplary embodiment of the present invention a modified vacuum device VU-1B was used for coating with aluminium. Preparation of vacuum device for coating was carried out by well-known principles and was performed as so-called predegassing-coating (at device reference voltage of up to 200 V) of all additional details used in the operating chamber. All operations were performed in the argon environment. Arc-light current was maintained stably at 42 A.

A metal basis was used for coating, which allowed transferring simultaneously the contacts on carbon electrodes with maximum area of 16 dm$^2$. Placing objects in the coating chamber was followed by general degassing in high vacuum at pressure $10^{-3}$-$10^{-4}$ Pa and at carbon materials temperature ~60° C. The distinctiveness of the method according to the described invention lies in manufacturing required contacts for carbon electrodes irrespective of carbon type by way of accurately controlled changes of coating conditions. The optimal thickness of the Al contact turned out to be 2 µm, which was achieved in 5 minutes on the average.

Figure 2:
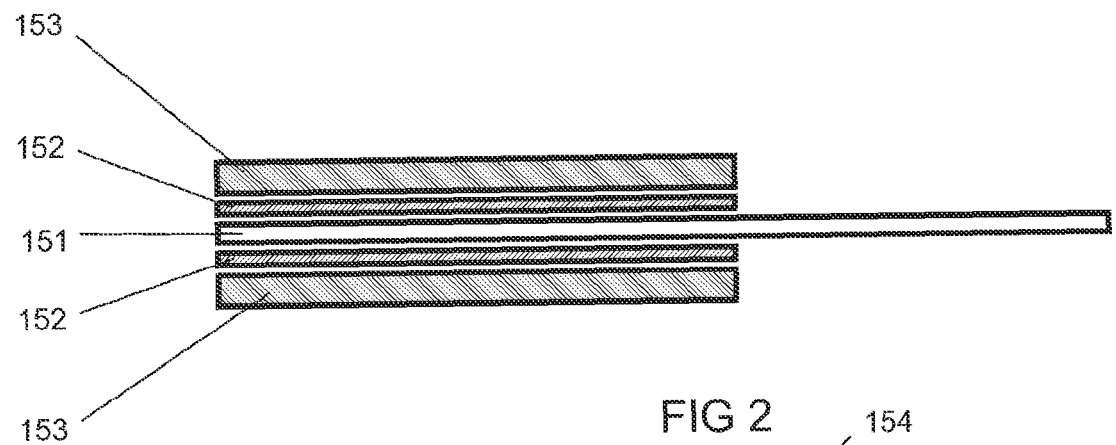
FIG. 2 shows schematically the cross-section of the super capacitor electrode with two operating surfaces according to the invention.

The mode of coating can be changed in two ways: by changing the object distance from the Al cathode and by changing the reference voltage. General rule states that by covering with metal the temperature of the basis needs to be approximately that of the covered metal in order to achieve better bonding. Distance from the cathode (~55 cm) was chosen so that it would cause no mechanical damage to the electrode and that the coated surface would be largest possible. Fine-tuning of the aluminium coatings' contact is performed by reference voltage within the range of 50V to 20V. The coating procedure can be divided into three stages. In the first stage, at the highest reference voltage, the temperature of the object reaches up to 150° C. In this stage, additional degassing and disposing of light carbon particles takes place, which are, for example weakly connected to the object. Also, certain activation of carbon surface takes place during which pores on the surface of carbon material will be freed from the additives that have adsorbed there. During the second stage, pores, grooves and gaps of the topmost particles of carbon film are filled with aluminium, which creates notionally a larger contact surface and better mechanical binding with the electrode and along with it also better contact resistance between Al and the electrode. Third stage runs at lower reference voltage so as to reduce possible mechanical defects and overheating of carbon material. At that stage a ~2 µm thick Al contact is formed, which connects Al "islands". FIG. 2 displays carbon composite electrodes 153 equipped with an aluminium contact 152, connected with the current collector 151 from two sides by pressure contact according to the invention.

Figure 3:
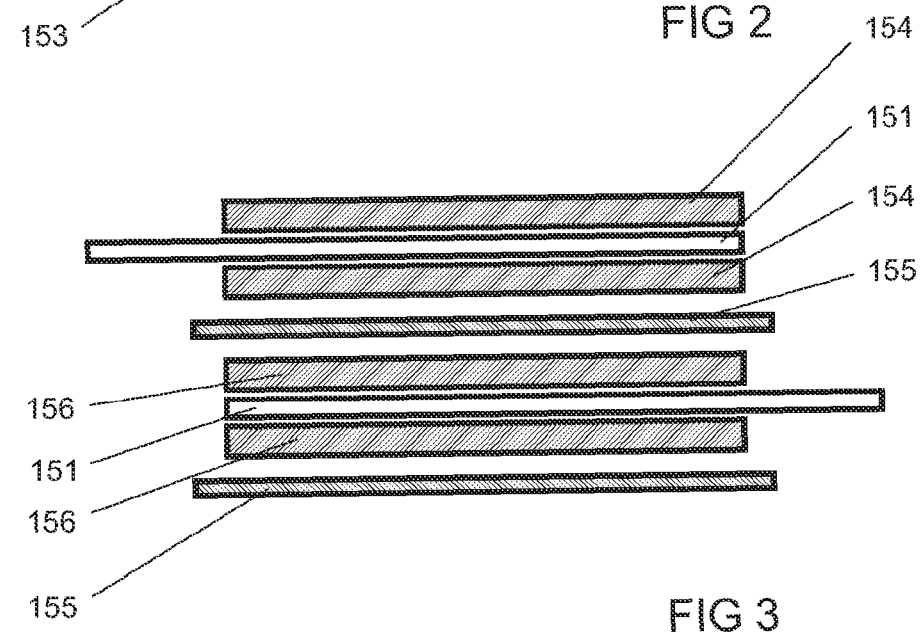
FIG. 3 shows schematically the planar package of the super capacitor electrodes according to the invention.
Figure 4:
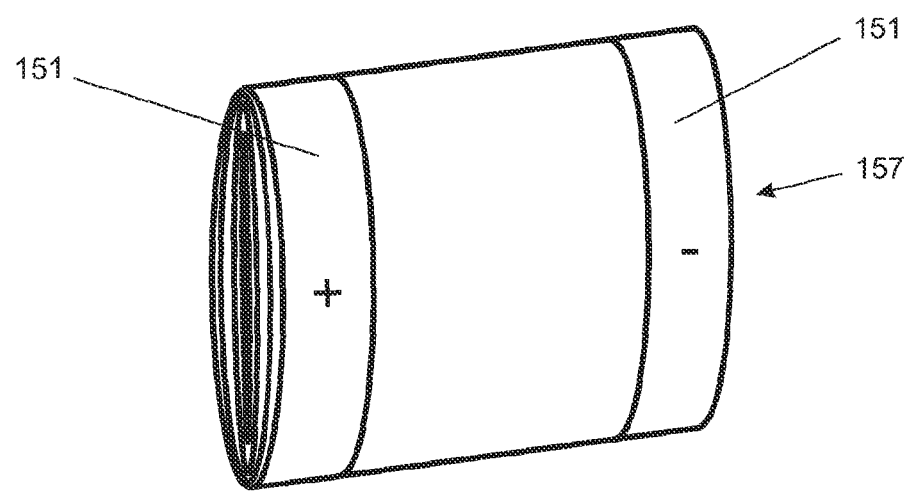
FIG. 4 shows the wound or flipped package of the super capacitor electrodes according to the invention.

Pairs of electrodes are formed from carbon composite electrodes, bound to the current collector, like the one shown on FIG. 3, where the positively charged carbon composite electrode 154, bound two-sided to the current collector 151, has been placed opposite to a negatively charged carbon composite electrode 156 of similar structure, whereby negatively and positively charged composite electrodes are separated from each other by a porous interim layer or separator 155 having ionic conductivity. Electrochemical super capacitor elements (see FIG. 3,4), wound or flipped to flat packages (155), are placed on top of each other and are connected by way of the ends of the current collector 151 protruding from packages by electrical parallel connection and the ends of current collectors are connected correspondingly to the positive and negative current terminals.

Figure 6:
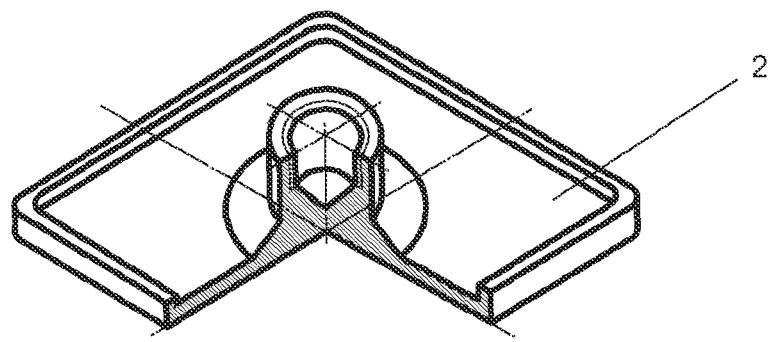
FIG. 6 shows the bottom cap of the super capacitor according to the invention.
Figure 8:
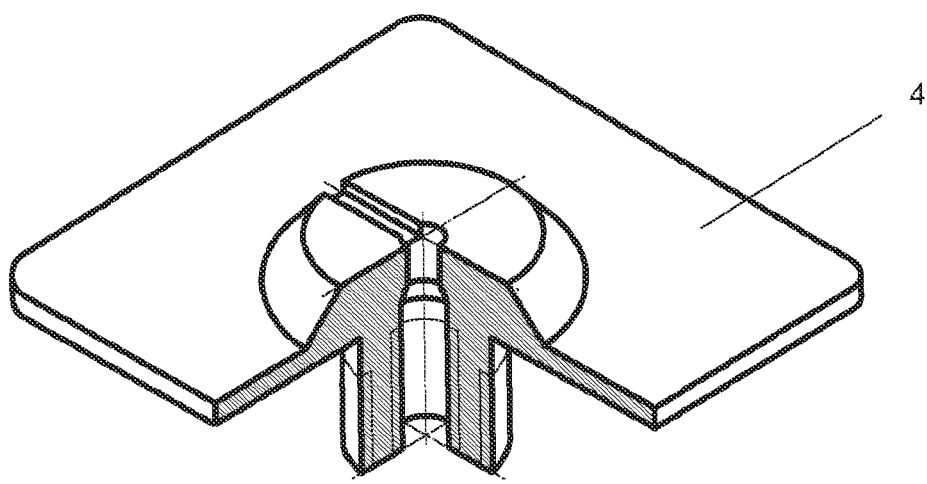
FIG. 8 shows the current terminal together with the charging hole of the electrolyte according to the invention.

Possible connection methods for current collectors and terminals: spot welding; TIG-welding; laser welding; diffusion welding; Al sputtering. Current invention presumes using diffusion or ultrasonic welding, which ensures homogenous contact surface of large area between the current collector ends made of aluminium foil and the current terminals (see FIGS. 6 and 8).

In the following the structure of prismatic super capacitor (see FIG. 1) according to the invention is described in more detail.

Housing

Figure 5:
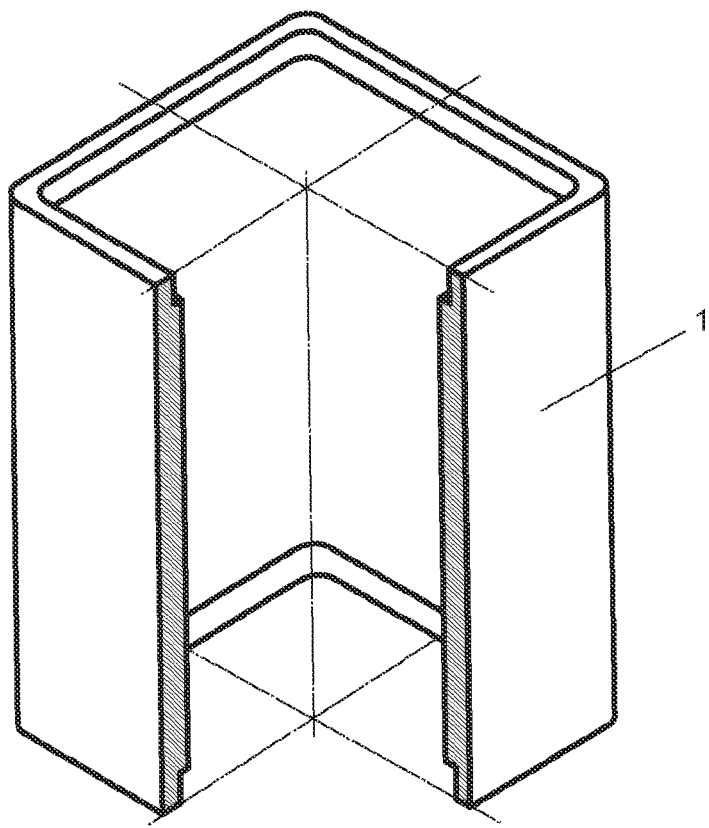
FIG. 5 shows the prismatic external part of the housing of the super capacitor housing according to the invention.

For example, aluminium square tube can be used for manufacturing the prismatic external part of the housing (see FIG. 5). All external surfaces can be milled over in order to reduce the weight to the necessary thickness providing required strength.

To the ends of tube's internal surface steps are milled corresponding to the thickness of caps so that the edges of the caps installed in the steps would remain exactly flush with the end surfaces of the tube (depth of steps must correspond to the thickness of caps).

Bottom Cap of the Capacitor

Bottom cap of the capacitor (see FIG. 6) forms also the minus-terminal of the capacitor and is milled out of an aluminium profile of rectangular cross-section. Bottom cap is formed of a low box with a thin edge, with a cylindrical-conical part protruding out of the centre of its external part. The cylindrical-conical part becomes a cylindrical part at its end, which has an internal thread for connecting the external circuit.

The perimeter of the bottom cap of the housing fits precisely into the step of the external part. The surface of the cap that remains inside the capacitor is a plane to which aluminium foil ends protruding out of the capacitor package are welded. The conducting cross-section of the cylindrical part can be calculated from the formula $$S_1 = \frac{(D_{external}^2 - D_{internal}^2)\pi}{4}$$

This area must correspond to the product of the length of cylindrical-cone's and cylinder's intersection and cap thickness at the intersection of the cylindrical cone and the cylindrical part:

$$S_2 = (\delta_{bottomcap} + h_{1,cyl-cone}) \times D_{external} \times \pi$$

Since $S_2 = S_1$, then $$h_{1,cone} = \frac{D_{external}^2 - D_{internal}^2}{4D_{external}} - \delta_{bottomcap}$$

The diameter of the cylindrical cone's bottom circle corresponds to the area, which is formed by the thickness of the planar portion of the cap multiplied by the perimeter of the bottom circle of the cone. Thickness of the planar portion of the bottom cap ($\delta_{bottom\ cap}$) is determined by the strength conditions for allowing welding the foils of the electrode package.

$$S_3 = \delta_{bottomcap} \times D_{bottomcircle}$$

Since the following condition remains valid $S_3=S_1=S_2$, it provides the following formula for calculating the diameter of the cylindrical cone's bottom circle:

$$D_{bottomcircle} = \frac{D_{ext.}^2 - D_{int.}^2}{4\delta_{bottomcap}}$$

Thickness of the edge of bottom cap is equal to the thickness of the housing tube at the milled tube step (facilitating welding the tube and the bottom cap).

Figure 7:
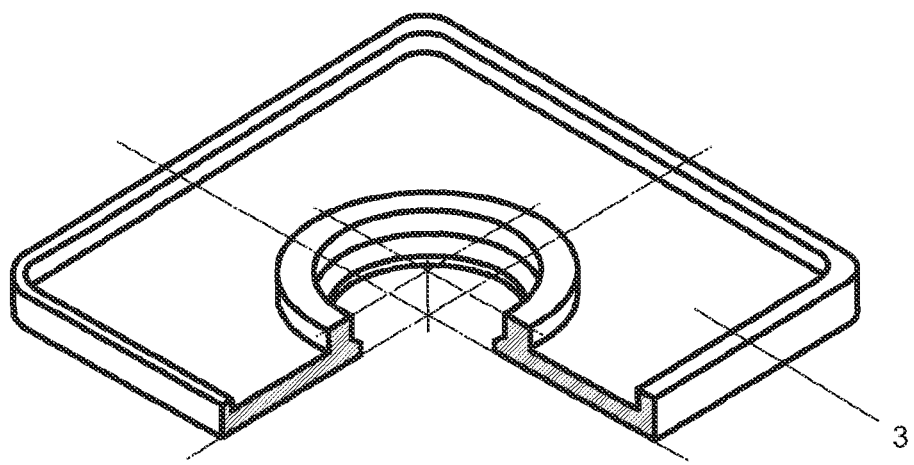
FIG. 7 shows the end cap of the super capacitor according to the invention.

Aluminium foil package, protruding from the capacitor package is welded to the bottom cap, for example by ultrasonic welding. The perimeter of ultrasonic welding spots (P) needs to meet the condition P≥$S_3$, whereas
P=(2a+2b)n, in which
a—length of the welding spot;
b—width of the welding spot;
n—quantity of welding spots End Cap of the Capacitor End cap of the capacitor (see FIG. 7) is milled out of an aluminium profile of rectangular cross-section. Insulated plus-terminal is brought out of the capacitor housing through the end cap. End cap is formed of a low box with a thin edge, having a cylindrical protruding part at its centre with an opening for guiding out the plus-terminal that is electrically insulated and hermetically sealed from rest of the housing.

Internal surface of the central opening of the end cap is made up of two cylindrical surfaces of different diameters and of a conical surface between them. Conical surface is necessary for tightening the O-ring with a nut screwed on the plus-terminal. End cap of the capacitor fits exactly into the step of the prismatic part of the housing with the step depth being equal to the height of the box edge. In assembling the capacitor the end cap is welded to the prismatic portion. In order to facilitate welding the thickness of the edge of the end cap is equal to the thickness of the prismatic portion at the step.

Current Terminal with the Charging Hole of the Electrolyte

Current terminal with the electrolyte charging hole (see FIG. 8) is manufactured from an aluminium profile of rectangular cross-section. Current terminal is formed of a plate, which has a cylindrical part with an external and internal thread protruding out of its topmost portion. Lower central part of the plate has an extrusion that improves conductivity and that diminishes conically to plate's thickness. Internal opening of the terminal is formed of three surfaces. Threaded internal part is necessary for fastening the plug of the external circuit and the electrolyte's charging hole. Central conical portion is for installing the O-ring seal of the charging hole plug and for hermetical sealing of the charging hole.

Lower cylindrical part of the opening with smaller diameter is necessary for forming the conical surface required for tightening and guiding surface of the charging hole plug. Upper part (exterior) of the cylindrical exterior part has been threaded for screwing in the nut required for making the current terminal hermetical. During assembly, a washer made of insulating material, an O-ring seal for providing air-tightness and a piece made of an insulating material for separating the current terminal from the end cap is placed under the nut.

Figure 9:
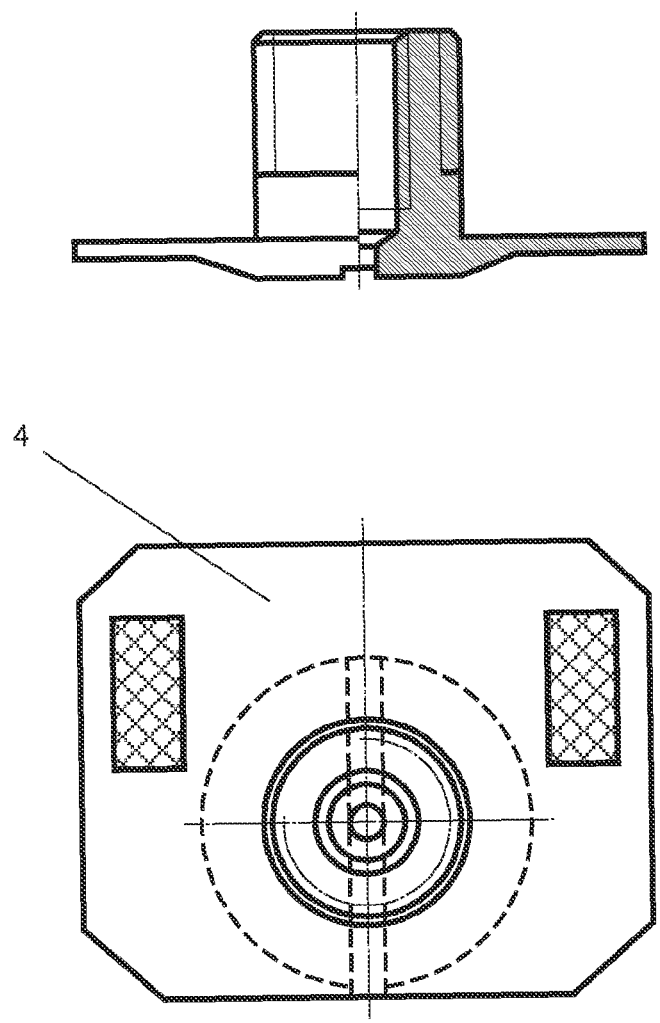
FIG. 9 shows the asymmetrical current terminal together with the charging hole of the electrolyte of the super capacitor according to the invention.
Figure 10:
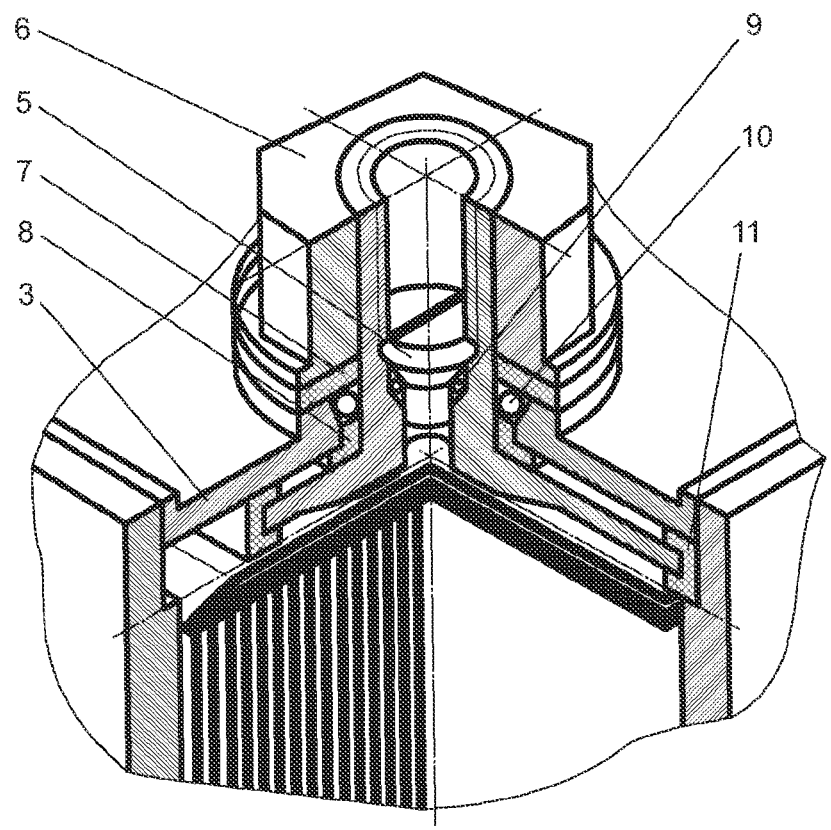
FIG. 10 shows the partial cross-section of the super capacitor with asymmetrical current terminal showed on FIG. 9.

Current terminal with the electrolyte charging hole can also have an asymmetrical shape as it is shown on FIG. 9. FIG. 10 displays the cross-section of a prismatic electrical double-layer capacitor with an asymmetrical current terminal, in addition to which location of the gaskets 7, 8, 9, 10, 11 can be seen where an insulating washer 7 has been placed between the end cap and a flanged nut of the current terminal 6 used in given alternative embodiment. A piece insulating the current terminal 8 has been installed between the current terminal 4 and the end cap 3. A current terminal gasket 10 has been installed between the insulating washer 7, the end cap 3, the current terminal 4 and the piece insulating the current terminal 8. Insulator of the external edge of the current terminal 11 has been installed between the external edge of the current terminal 4, the end cap 3, and capacitor housing, so as to insulate the current terminal 4 from the housing of the capacitor and the end cap.

Current terminal 4 and end cap 3 are tightened with a rubber O-ring seal, whereas two surfaces are used for tightening: external surface of the cylinder downward (inside) the threaded external surface of the current terminal and conical internal surface of the end cap.

On the protrusion of the planar circular central part inside the capacitor of the current terminal and on the cylindrical-conical part extending radially outward from it there are two converging grooves passing through the central opening of the current terminal for ensuring better charging with the electrolyte and vacuuming of the capacitor prior to charging.

Aluminium foils protruding from the capacitor package are welded by ultrasonic welding onto the inside surface of the current terminal capacitor to the planar surface on the side of the perimeter. The perimeter of ultrasonic welding spots P needs to meet the condition P≥(2a+2b)n, in which
a—length of the welding spot
b—width of the welding spot
n—quantity of welding spots It is necessary to bear in mind about dimensions when ensuring low internal resistance of the capacitor that the conducting cross-section of the current terminal's cylindrical part is calculated by a formula $$S_4 = \frac{(D_{external}^2 - D_{internal}^2)\pi}{4},$$

whereas $S_4=S_1$

It is not necessary here to consider the constriction of the cross-section resulting from the external thread because the nut covers the external thread to its end and therefore does not reduce the cross-section of the flow path.

Thickness of the planar part on the side of the current terminal's perimeter ($\delta_{current\ terminal}$) is taken as equal to the thickness of the planar part of the end cap.

In calculating the height of the protrusion on the lower part of the current terminal one has to take into account the area reducing the cross-section of the flow path of the converging groove $S_4$. Current terminal's flow path area on the plate in the place where cylindrical part becomes a plate needs to correspond to the product of the sum of basis's thickness and cylindrical cone's height and the perimeter of the cylindrical external surface, to which have been added cross-section areas of four converging grooves:

4(c×d), in which
c—groove depth, which does not exceed 50% of the cylindrical cone's height $h_{2,\ cylindrical\ cone}$ and
d—groove width, whereas $$h_{2,cylindricalcone} = \frac{\frac{(D_{external}^2 - D_{internal}'^2)\pi}{4} + 4(c \times d)}{D_{external}\pi} - \delta_{currentterminal}$$

Diameter of the cylindrical cone's bottom circle is $$D_{bottomcircle} = \frac{D_{ext.}^2 - D_{int.}^2}{4\delta_{currentterminal}}$$

In order to provide electric insulation the perimeter of the current terminal's plate has been encased with a casing made of shrinkable tube between the current terminal and prismatic part of the housing and the end cap and current terminal.

Charging Hole Plug

The charging hole plug has been manufactured from duralumin for providing necessary strength. External surface of the plug has been threaded (must fit into the threaded opening of the current terminal) and narrows in the inside end into a conical surface for compressing the rubber O-ring seal necessary for providing the air-tightness. From there on the conical surface becomes cylindrical part (necessary for installing the O-ring seal). A groove for the screwdriver has been cut into the outer end of the plug.

Current Terminal Nut

The current terminal nut has been manufactured from a round bar of aluminium. The nut is necessary for compressing the O-ring seal, placed on the cylindrical part of the current terminal and providing air-tightness. The nut has been equipped with a flange in order to prevent the wrench from contacting the housing having the opposite charge. The nut thread corresponds to the external thread of the current terminal.

Insulating Washer of the Nut

Insulating washer of the nut has been manufactured from dielectric material. The task of the insulating washer is to prevent the contact of the nut and housing cap of opposite charges.

The Piece Insulating the Current Terminal

The piece insulating the current terminal has been manufactured from dielectric material. The task of the piece is to centre the current terminal in relation to the capacitor end cap opening and insulate the current terminal from the end cap.

Rubber gasket of the charging hole and rubber gasket of the current terminal are regular, commercially available O-ring seals for providing insulation of the capacitor contents from the external environment.

The shrinkable insulator of the current terminal's inner edge is a piece of a standard glue-free commercially available shrinkable tube, which is placed on the exterior edge of the current terminal before placing the contents of the capacitor in the housing and is shrunk with hot air. The task of this insulator is to prevent the electrical contact of the prismatic part of the housing which is under different potentials and the current terminal.

Plates insulating the capacitor ends on the side of the external current terminal have been manufactured from rigid insulating material. Their external perimeter corresponds to the capacitor's external perimeter and has an opening in the middle, into which the current terminal fits (positive current terminal with a nut). Plates are fastened to the housing by shrinking the part of the shrinkable tube extending beyond the prismatic part.

External shrinkable cover insulating the prismatic part of the capacitor is a standard glue-free commercially available shrinkable tube, the task of which is to insulate electrically the external side surface of the capacitor and the ends extending over its side surface fasten the plates insulating the capacitor ends upon shrinking of the tube.

An important parameter of the super capacitor according to the present invention is its geometric dimensions, more specifically, certain ratio of its cross-section and length, which achieves the maximum weight average specific power output value. That kind of ratio of dimensions is hereinafter called golden section.

In calculating the golden section a technological free space is added to the capacitor electrode dimension, which derives from the capacitor design—method of connecting the collectors and current terminals.

Super capacitor consists of an electrochemical system: positively and negatively polarised electrodes (so-called anodes and cathodes) that are separated from each other by an ion-conductive membrane (so-called separator) and an electrolyte with which electrodes and separator are saturated.

The electrochemical system in the super capacitor is accompanied also by current collectors connecting the electrodes, by which charges are guided to the capacitor current terminals and by a hermetical and insulating housing closing this system.

Electric diagram of the super capacitor according to the invention, which is displayed on FIG. 10, consists of a capacitor element $C_1$, to which is added the sum of resistances of terminals, collector resistances and electrochemical system's resistance. Resistance of the electrochemical system in present invention is a complex quantity, which comprises resistances of polarised electrodes and resistances of aluminium contacts manufactured for them and separator resistance separating the electrodes.

In dimensioning the capacitor maximum amount of charges is attempted to be guided through the electrochemical system ($R_{es}$ and $C_1$), so that the resistances of the element's current collectors and current terminals would not start restricting the resistance of the entire element $R_s$, expressed as $R_s \geq \Sigma(R_t^-, R_t^+, R_k^-, R_k^+)$ The basis for modelling the capacitor is the volumes of electrodes, separators and current collectors fitting into unit volume according to their prescribed thicknesses. Also, length of the electrochemical system has been defined, which, due to technical solutions, is 18 mm shorter than the external dimension of the housing. Separator widths and electrode widths are also derived from this length along with the dimensions of current collectors connecting them.

The following fixed parameters are used for calculating capacitor parameters:

1) Thicknesses: anode 90 μm, cathode 95 μm, separator 25 μm, current collector 18 μm, based on which the dimensions of materials: separator, electrode and current collectors belonging to the electrochemical system with fixed dimensions was calculated as well as the amount of the electrolyte.

2) Resistance of the electrochemical system, calculated from the ratio of the electrochemical system's specific resistance $R_{spec}$ and the electrode surface $S_{electrode}$.

$$R_{es} = \frac{R_{spec}}{S_{electrode}},$$

in which $R_{spec}$ is the specific resistance of the electrochemical system, which includes the resistance of the electrode pair, saturated with the electrolyte and divided by a separator and the charge transition resistance on the carbon-aluminium boundary surface. Its value is calculated by formula $R_{spec}=R \times S$, in which R is the internal resistance of the unit cell and S is the apparent geometric area of one electrode of the unit cell. Unit cell is here an electrochemical experimental cell with small capacity that lacks current collectors and based on these experimental data the $R_{spec}$ value ~0.55 $\Omega cm^2$ is calculated.

3) current collector resistances $R_k^+$ and $R_k^-$ are added to the resistance of the capacitor electrochemical system according to FIG. 10 and their values are derived from the variable of the specific resistance of the collector material $\rho$, e.g. aluminium. Numerical values of corresponding resistances are calculated by the cross-section and lengths of corresponding current collectors, derived from the capacitor dimensions.

$$R_k = \frac{l_k \times \rho}{S_k},$$

in which $S_k$ is the current collector cross-section, $I_k$ is the current collector length and $\rho$ is specific resistance of the material. The estimated length of the current collector $I_k$ is the double capacitor cross-section dimension, to which is added half the length of the electrochemical system.

4) Values of terminal resistances have been calculated on the basis of the material of corresponding terminal and its cross-section $$R_t = \frac{l_t \times \rho}{S_t},$$

in which $S_t$ is terminal's cross-section area, $I_t$ is terminal's length and p is material's specific resistance.

In order to find the capacitor's golden section, a square tube with 1.0 mm wall thickness and internal dimensions of 36×36 mm was chosen, the length of which was varied in the range of 47 mm to 136 mm. The dimensions of the calculated electrochemical package were set 18 mm shorter and from the dimensions of the corresponding electrochemical package was calculated the electrical capacity of the capacitor element $C_1$ according to the formula $C_1=(C_{spec}^+ \times S_{electrode}^+ \times h_{electrode}^+)+(C_{spec}^- \times S_{electrode}^- \times h_{electrode}^-)$, in which $C_{spec}$ are specific capacities of the anode and the cathode expressed as [F/cm$^3$], $S_{electrode}$ is areas of corresponding electrodes and $h_{electrode}$ is thicknesses of corresponding electrodes. From these dimensions are derived the volumes of anode and cathode carbons fitting into the package.

In summing up the masses of received components the mass of the entire element is obtained and from the housing dimensions the capacitor volume is obtained, from which specific volumes $C_g$ (gravimetric) and $C_v$ (volumic) of capacitors are obtained according to the formulae $$C_g = \frac{C_1}{m}, C_v = \frac{C_1}{V}.$$

Capacitor's specific capacity can be calculated from the formula $$P_{max} = \frac{U^2}{4R_s \times m},$$

in which U is the capacitor operating voltage, R is the capacitor internal resistance and m is the capacitor mass. From this the relative specific power output of capacitors is calculated, the basis of which is a=b=c, in which a, b and c are lengths of capacitor's edges, in case of which $P_{max}=1$.

Figure 11:
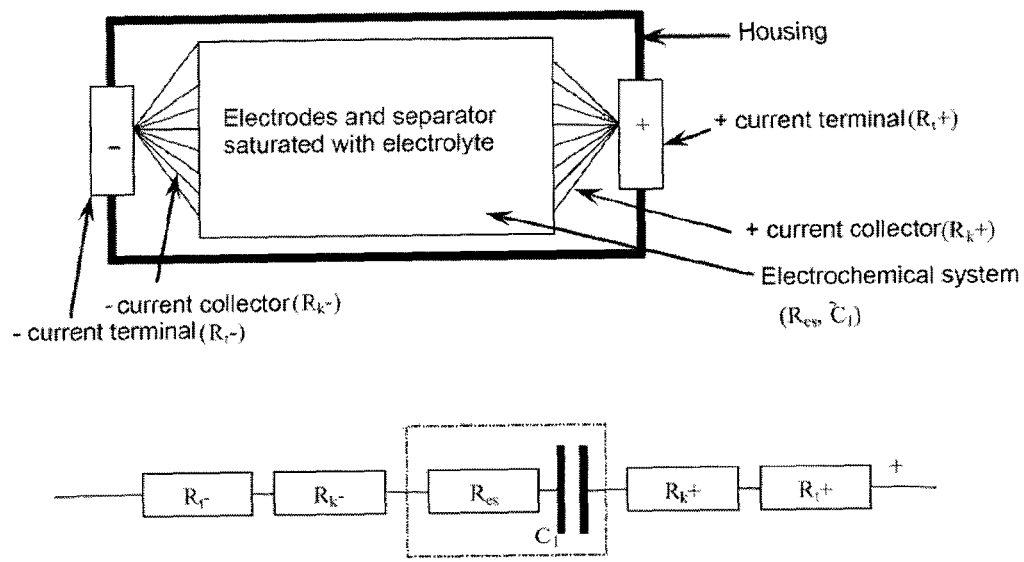
FIG. 11 shows the electric diagram and cross-section characterising the super capacitor according to the invention.
Figure 12:
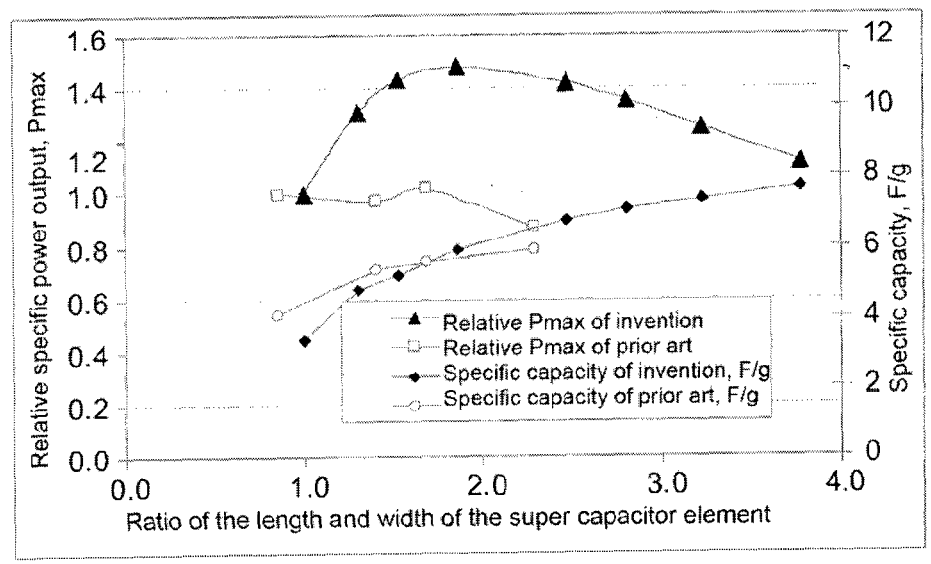
FIG. 12 shows finding the so-called golden section ratio of the length and width corresponding to the maximum specific power output of the super capacitor element according to the invention, whereas width is taken as the constant.

In Table 1 and FIG. 11 an example of a calculation of the golden section of the capacitor according to the invention has been displayed.

TABLE 1

| Square tube length, mm | 36 | 47 | 55 | 67 | 89 | 101 | 116 | 136 |
|---|---|---|---|---|---|---|---|---|
| Calculated capacity, F | 297 | 531 | 658 | 898 | 1336 | 1576 | 1875 | 2274 |
| Internal resistance, m$\Omega$ | 0.89 | 0.54 | 0.44 | 0.35 | 0.28 | 0.26 | 0.25 | 0.24 |
| Mass, g | 88.6 | 111.7 | 127.3 | 152.3 | 198.2 | 223.2 | 254.5 | 296.2 |
| Element volume, cm$^3$ | 52.0 | 67.9 | 79.4 | 96.7 | 128.5 | 145.8 | 167.5 | 196.4 |
| Specific capacity, F/g | 3.4 | 4.8 | 5.2 | 5.9 | 6.7 | 7.1 | 7.4 | 7.7 |
| Pmax, kW/kg | 25.5 | 33.4 | 36.5 | 37.9 | 36.3 | 34.6 | 31.9 | 28.6 |
| Relative packing density, Pt | 4.3 | 3.1 | 3.0 | 2.6 | 2.4 | 2.3 | 2.2 | 2.1 |

Relative packing density Pt describes the relative quantity of electrode carbon in the electrode and capacitor and is expressed by a formula:

$$Pt = \frac{\rho_{electrode}}{\frac{\sum m_{electrode}}{V_{SC}}},$$

in which $V_{SK}$ is the total volume of the super capacitor and $m_{electrode}$ is the total volume of capacitor electrodes.

Table 2 lists exemplary embodiments of super capacitors according to the invention, which have achieved maximum specific output $P_{max}$ with various cross-sections and corresponding relative packing density.

TABLE 2

Packing densities and maximum specific outputs for a super capacitor with various cross-sections according to the invention.

| Capacitor cross-section (mm) | 47 × 47 | 38 × 38 | 33 × 33 | 24 × 24 |
|---|---|---|---|---|
| Max. specific output, Pmax (kW/kg) | 38.4 | 37.9 | 39.9 | 37.2 |
| Relative packing density | 2.6 | 2.6 | 2.7 | 2.8 |

Electrochemical system that has been packed into the housing is dried by vacuuming and saturated with the electrolyte solution.

Aprotonic electrolyte can consist of an organic solvent and an aprotonic salt that provides ion pairs. Electrolyte salts can be quaternary ammonium salts and quaternary phosphonium salts, e.g. tetra ethyl ammonium-tetrafluoroborate, triethylmethylammonium tetrafluoroborate, etc. or mixtures thereof.

Electrolyte salt cation can be $R_1R_2R_3R_4N^+$ or $R_1R_2R_3R_4P^+$ in which $R_1$, $R_2$, $R_3$ and $R_4$ are alkyl groups —$CH_3$ to —$C_5H_{11}$ or cyclic phenyl radical —$C_6H_5$ and anion can be $BF_4^-$, $PF_6^-$, $AsF_6^-$, $BPh_4^-$, $CF_3SO_3^-$, etc. In case of carbidic carbon electrodes with high micropore content appropriate salts include for example triethyl ammonium tetrafluoroborate (TEMATFB) and trimethyl ethyl ammonium tetrafluoroborate (TMEATFB) and tetraethyl ammonium tetrafluoroborate (TEATBF) or mixture thereof.

Possible solvents in the electrolyte composition include various nitriles (e.g. acetonitrile, (AN)), cyclic carbonates (e.g. ethylenecarbonate (EC) and propylenecarbonate, PC), lactones (e.g. γ-butyrolactone (GBL)), also various sulfolanes, esters, ethers, tetrahydrofuran, N,N-dimethylformamide, dimethylsulfoxide, pyridine derivates, etc. The best aprotonic solvent so far to be used for the ammonium salts used in the electrolyte—AN, has been declared as belonging to the class of hazardous compounds and its use has therefore been significantly restricted. In order to improve the properties of an AN-free electrolyte, multi-component solvent mixtures are considered. An electrolyte with good conductivity properties, low production cost, low toxicity and good electrochemical stability that can be utilised in the wide temperature range can be manufactured by diluting high-polarity cyclic carbonates (e.g. EC and PC) with aliphatic carbonates of low viscosity (e.g. dimethyl carbonate (DMC), diethyl carbonate (DEC) and ethyl methyl carbonate (EMC). One of the possible recipes is EC+PC+DMC+DEC+EMC with the mass ratio of 19.2:7.4:12.0:1.0:6.8.

Also, ionic liquids based on imidazolium derivatives can be used as electrolytes or electrolyte additives, e.g. $EMIBF_6$, $EMICF_3SO_3$, etc. either as concentrates or with solvents.

The invention claimed is:

1. Method for manufacture of the electrochemical system of the super capacitor of high specific capacity and energy density, comprising manufacture of electrically connected in parallel of semi-wound packages of micro/mesoporous carbon composite electrode pairs separated by porous cage, including steps in which:
   a) pre-made carbon film is dried in vacuum at up to 150° C. and is cut to the electrode dimensions,
   b) an aluminium layer is deposited to the carbon film by vacuum deposition method, forming a current collector, whereas, carbon film temperature is maintained during covering approximately same as that of the covered metal, whereas
   c) controlling of the aluminium coating contact is performed by reference voltage within the range of 50V to 20V, whereas
      i) firstly, temperature is raised to up to 150° C. at highest reference voltage for additional degassing and disposing of light carbon particles, then
      ii) pores, grooves and gaps of the topmost particles of carbon film are filled with aluminium and then
      iii) reference voltage is reduced for completing the process of covering.

2. Method according to claim 1, characterised by that pairs of electrodes (151, 154, 155, 156) are formed from carbon composite electrodes bound to the current collector, whereas positively charged carbon composite electrode (154), bound from two sides to the current collector, is aligned with a negatively charged carbon composite electrode (156), bound from two sides to the current collector, so that positively charged and negatively charged carbon composite electrodes are separated from each other by a porous intermediate layer having ionic conductivity (155).

3. Method according to claim 2, characterised by that pairs of electrodes are wound or flipped to flat packages (157), which are placed on top of each other so that the ends of current collectors protruding from folded packages are joined together in parallel and thereafter the ends of current collectors are connected correspondingly to the positive and negative current terminal of the electric double-layer capacitor.

4. Super capacitor of high specific capacity and energy density, prepared according to the electrochemical system of claim 2, which includes prismatic exterior part of the capacitor (1), with a bottom cap (2) of the capacitor attached to its one end and the end cap (3) of the capacitor attached to the other end, to which, by way of a current terminal nut (6) is attached to the current terminal (4) with an electrolyte charging hole and cap (5) and gasket (9) of the charging hole, with an insulating washer (7), placed between the nut (6) and the end cap (3) and with a insulating piece (8) located between the current terminal and the end cap (3), whereas a current terminal gasket (10) has been placed between the current terminal (4), end cap (3) and nut (6) and insulator of the outer edge of the current terminal (11) has been placed between the outer edge of the current terminal (4), end cap (3) and prismatic exterior part of the capacitor (1).

5. Super capacitor of high specific capacity and energy density, prepared according to the electrochemical system of claim 3, which includes prismatic exterior part of the capacitor (1), with a bottom cap (2) of the capacitor attached to its one end and the end cap (3) of the capacitor attached to the other end, to which, by way of a current terminal nut (6) is attached to the current terminal (4) with an electrolyte charging hole and cap (5) and gasket (9) of the charging hole, with an insulating washer (7), placed between the nut (6) and the end cap (3) and with a insulating piece (8) located between the current terminal and the end cap (3), whereas a current terminal gasket (10) has been placed between the current terminal (4), end cap (3) and nut (6) and insulator of the outer edge of the current terminal (11) has been placed between the outer edge of the current terminal (4), end cap (3) and prismatic exterior part of the capacitor (1).

6. Super capacitor of high specific capacity and energy density, prepared according to the electrochemical system of claim 1, which includes prismatic exterior part of the capacitor (1), with a bottom cap (2) of the capacitor attached to its one end and the end cap (3) of the capacitor attached to the other end, to which, by way of a current terminal nut (6) is attached to the current terminal (4) with an electrolyte charging hole and cap (5) and gasket (9) of the charging hole, with an insulating washer (7), placed between the nut (6) and the end cap (3) and with a insulating piece (8) located between the current terminal and the end cap (3), whereas a current terminal gasket (10) has been placed between the current terminal (4), end cap (3) and nut (6) and insulator of the outer edge of the current terminal (11) has been placed between the outer edge of the current terminal (4), end cap (3) and prismatic exterior part of the capacitor (1).

7. Super capacitor according to claim 6, characterised by that there is a cylindrical-conical part, emerging from the centre of the bottom cap (2), which has a cylindrical part emerging from its face plate, which includes an internal thread for connecting the capacitor with the external circuit, whereas the cross-section area $S_2$ of the conducting part of the cylindrical-conical part is equal with the cross-section area $S_1$ of the conducting part of the cylindrical part and cross-section area $S_3$ of the conducting part of the flat mid-part of the bottom cap.

8. Method of manufacturing a super capacitor, comprising an electric double-layer capacitor, according to claim 7, in which following the assembly of the capacitor the electrochemical system, installed in the capacitor housing, is filled with an electrolyte, comprising any anhydrous organic salt or saline solution, existing in ion pairs in its liquid state, which has been selected from the quaternary ammonium salts or quaternary phosphonium salts or mixtures thereof, from ionic fluids based on imidazolium derivatives, whereas the electrolyte salt cation can include $R_1R_2R_3R_4N^+$ or $R_1R_2R_3R_4P^+$, in which $R_1$, $R_2$, $R_3$ and $R_4$ are alkyl groups from —$CH_3$ to —$O_5H_{11}$ or cyclic phenyl radical —$C_6H_5$ and anion can include $BF_4^-$, $PF_6^-$, $AsF_6^-$, $BPh_4^-$, $CF_3SO_3^-$.

9. Super capacitor according to claim 6, characterised by that the current terminal (4) has a cylindrical part, which has been placed through the bottom cap (2) and which has an external thread for the current terminal nut (6), whereas the cross-section area of the cylindrical conducting part of the current terminal is equal with the cross-section area of the flat, conducting, mid-part of the conductor's bottom cap.

10. Method of manufacturing a super capacitor, comprising an electric double-layer capacitor, according to claim 9, in which following the assembly of the capacitor the electrochemical system, installed in the capacitor housing, is filled with an electrolyte, comprising any anhydrous organic salt or saline solution, existing in ion pairs in its liquid state, which has been selected from the quaternary ammonium salts or quaternary phosphonium salts or mixtures thereof, from ionic fluids based on imidazolium derivatives, whereas the electrolyte salt cation can include $R_1R_2R_3R_4N^+$ or $R_1R_2R_3R_4P^+$, in which $R_1$, $R_2$, $R_3$ and $R_4$ are alkyl groups from —$CH_3$ to —$O_5H_{11}$ or cyclic phenyl radical —$C_6H_5$ and anion can include $BF_4^-$, $PF_6^-$, $AsF_6^-$, $BPh_4^-$, $CF_3SO_3^-$.

11. Super capacitor according to claim 6, characterised by that the maximum specific output Pmax of the capacitor is dependent on the ratio of the length and cross-section of the housing at maximum packing density, whereas the areas of varying cross-sections of the capacitor end cap and bottom cap and the current terminal are equal, meeting the condition $S_1=S_2=S_3=S_4$.

12. Super capacitor according to claim 11, characterised by that the average pore size of the capacitor's positive and negative electrode is different and this difference increases as the size difference of electrolyte's anions and cations, used in the capacitor, increases.

13. Method of manufacturing a super capacitor, comprising an electric double-layer capacitor, according to claim 11, in which following the assembly of the capacitor the electrochemical system, installed in the capacitor housing, is filled with an electrolyte, comprising any anhydrous organic salt or saline solution, existing in ion pairs in its liquid state, which has been selected from the quaternary ammonium salts or quaternary phosphonium salts or mixtures thereof, from ionic fluids based on imidazolium derivatives, whereas the electrolyte salt cation can include $R_1R_2R_3R_4N^+$ or $R_1R_2R_3R_4P^+$, in which $R_1$, $R_2$, $R_3$ and $R_4$ are alkyl groups from —$CH_3$ to —$O_5H_{11}$ or cyclic phenyl radical —$C_6H_5$ and anion can include $BF_4^-$, $PF_6^-$, $AsF_6^-$, $BPh_4^-$, $CF_3SO_3^-$.

14. Super capacitor according to claim 6, characterised by that micro/mesoporous carbon electrodes are manufactured of activated carbon of large specific surface area, which has been prepared by using phenolic resins, nutshells, sugar, carbon-rich organic fibres, metallic or non-metallic carbides.

15. Method of manufacturing a super capacitor, comprising an electric double-layer capacitor, according to claim 14, in which following the assembly of the capacitor the electrochemical system, installed in the capacitor housing, is filled with an electrolyte, comprising any anhydrous organic salt or saline solution, existing in ion pairs in its liquid state, which has been selected from the quaternary ammonium salts or quaternary phosphonium salts or mixtures thereof, from ionic fluids based on imidazolium derivatives, whereas the electrolyte salt cation can include $R_1R_2R_3R_4N^+$ or $R_1R_2R_3R_4P^+$, in which $R_1$, $R_2$, $R_3$ and $R_4$ are alkyl groups from —$CH_3$ to —$O_5H_{11}$ or cyclic phenyl radical —$C_6H_5$ and anion can include $BF_4^-$, $PF_6^-$, $AsF_6^-$, $BPh_4^-$, $CF_3SO_3^-$.

16. Super capacitor according to claim 6, characterised by that the total capacities of positively and negatively charged carbon electrodes are balanced according to the size of pores of the carbon used for manufacturing the carbon electrode, so that the pore size of the carbon corresponds to the size of ions, which guarantees the low internal resistance and high energy density of the electric double-layer capacitor.

17. Method of manufacturing a super capacitor, comprising an electric double-layer capacitor, according to claim 16, in which following the assembly of the capacitor the electrochemical system, installed in the capacitor housing, is filled with an electrolyte, comprising any anhydrous organic salt or saline solution, existing in ion pairs in its liquid state, which has been selected from the quaternary ammonium salts or quaternary phosphonium salts or mixtures thereof, from ionic fluids based on imidazolium derivatives, whereas the electrolyte salt cation can include $R_1R_2R_3R_4N^+$ or $R_1R_2R_3R_4P^+$, in which $R_1$, $R_2$, $R_3$ and $R_4$ are alkyl groups from —$CH_3$ to —$C_5H_{11}$ or cyclic phenyl radical —$C_6H_5$ and anion can include $BF_4^-$, $PF_6^-$, $AsF_6^-$, $BPh_4^-$, $CF_3SO_3^-$.

18. Method of manufacturing a super capacitor, comprising an electric double-layer capacitor, according to claim 6, in which following the assembly of the capacitor the electrochemical system, installed in the capacitor housing, is filled with an electrolyte, comprising any anhydrous organic salt or saline solution, existing in ion pairs in its liquid state, which has been selected from the quaternary ammonium salts or quaternary phosphonium salts or mixtures thereof, from ionic fluids based on imidazolium derivatives, whereas the electrolyte salt cation can include $R_1R_2R_3R_4N^+$ or $R_1R_2R_3R_4P^+$, in which $R_1$, $R_2$, $R_3$ and $R_4$ are alkyl groups from —$CH_3$ to —$C_5H_{11}$ or cyclic phenyl radical —$C_6H_5$ and anion can include $BF_1^-$, $PF_6^-$, $AsF_6^-$, $BPh_4^-$, $CF_3SO_3^-$.

19. Method of manufacture of electrical double-layer capacitor according to claim 18, characterised by that the electrolyte solvents have been selected from nitriles, cyclic carbonates and propylene carbonates, lactones, sulfolanes, esters, ethers, tetrahydrofurans, N,N-dimethylformamides, dimethyl sulfoxides and pyridine derivatives.

20. Method of manufacture of electrical double-layer capacitor according to claim 19, characterised by that the electrolyte is prepared from the mixture of ethylene carbonate (EC), propylene carbonate (PC), dimethyl carbonate (DMC), diethyl carbonate (DEC) and ethylmethyl carbonate (EMC), in which the preferred mixture is EC+PC+DMC+DEC+EMC with mass ratio of 19.2:7.4:12.0:1.0:6.8.

* * * * *